United States Patent [19]

Hopkins

[11] 4,102,360
[45] Jul. 25, 1978

[54] HOSE CONSTRUCTION

[75] Inventor: Carl E. Hopkins, Dover, N.J.

[73] Assignee: Dayco Corporation, Dayton, Ohio

[21] Appl. No.: 584,448

[22] Filed: Jun. 6, 1975

Related U.S. Application Data

[63] Continuation-in-part of Ser. No. 426,986, Dec. 20, 1973, abandoned.

[51] Int. Cl.² ............................................. F16L 11/08
[52] U.S. Cl. ................................... 138/127; 138/138; 138/144; 156/149; 156/195
[58] Field of Search ............... 138/137, 138, 141, 144, 138/118, 123, 124–126; 156/149, 144, 188, 195

[56] References Cited

U.S. PATENT DOCUMENTS

| | | | |
|---|---|---|---|
| 3,253,618 | 5/1966 | Cook | 156/149 |
| 3,253,619 | 12/1968 | Cook et al. | 156/149 |
| 3,414,448 | 12/1968 | Harpfer | 156/149 |
| 3,447,571 | 6/1969 | Lejeune | 138/138 |
| 3,550,640 | 12/1970 | Wagner et al. | 138/137 |

Primary Examiner—Richard E. Aegerter
Assistant Examiner—L. Footland
Attorney, Agent, or Firm—Reuben Wolk

[57] ABSTRACT

An irradiated polyethylene tube is supported on a mandrel with adhesive material applied against its outside surface whereupon a first tubular layer is braided against the adhesive means followed by a tubular layer of neoprene rubber followed by braiding a second tubular layer against the neoprene rubber to define an assembly which is subjected to a controlled temperature environment to simultaneously vulcanize the rubber and bond the tube and tubular layers together defining the hose construction as a unitary structure.

6 Claims, 9 Drawing Figures

U.S. Patent     July 25, 1978     4,102,360
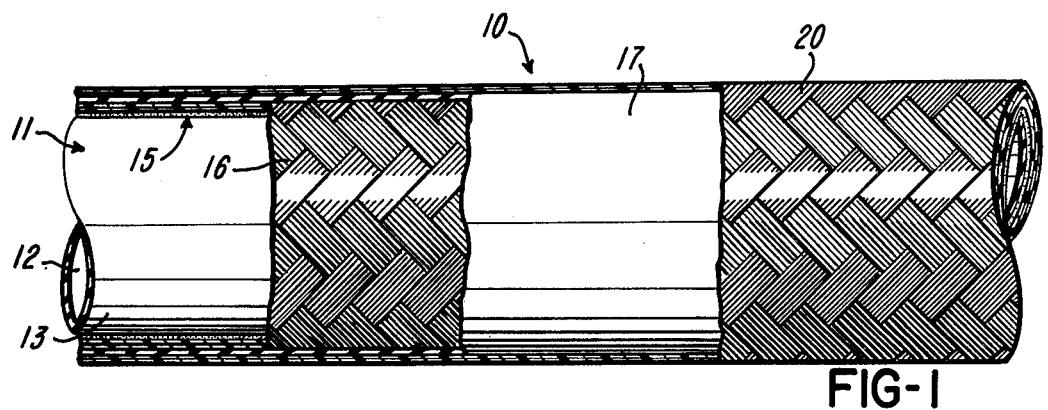
FIG-1
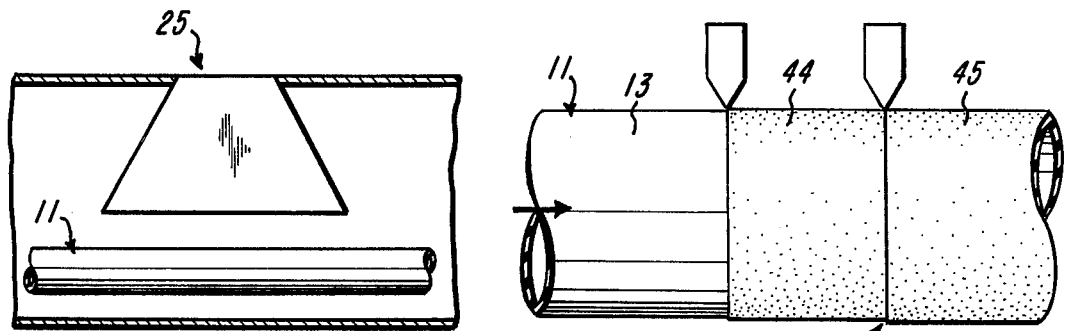
FIG-2     FIG-4
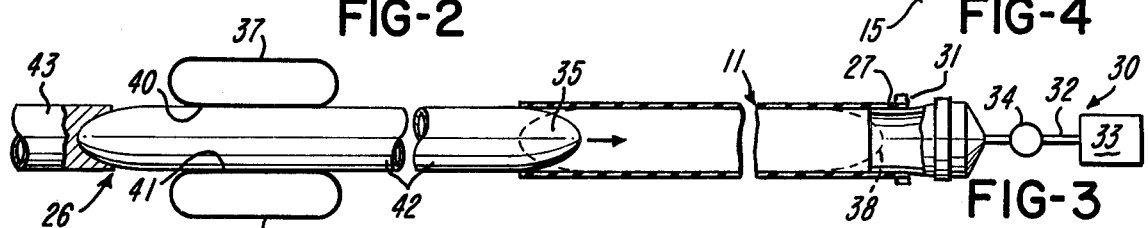
FIG-3
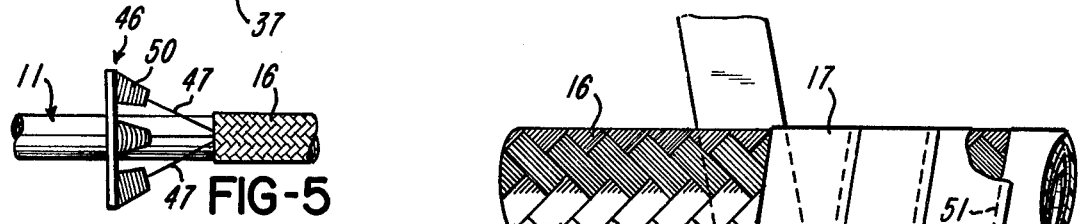
FIG-5     FIG-6
FIG-7     FIG-8
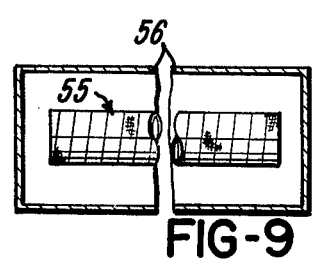
FIG-9

HOSE CONSTRUCTION

RELATED APPLICATION

This application is a Continuation-in-Part of application Ser. No. 426,986 filed Dec. 20, 1973, now abandoned.

BACKGROUND OF THE INVENTION

There are hose constructions in present use which utilize an inner polyethylene tube which is cured by having its molecules crosslinked through the use of commercially available peroxides. In manufacturing such hose constructions an uncured polyethylene tube often made up of one to four parts of peroxide to each one hundred parts of polyethylene is provided and wrapped with a non-adhering plastic film, protectively covered with a nylon wrapping cloth, and the polyethylene tube cured for roughly two hours at 300° F. The plastic film and nylon wrapping cloth are then removed and discarded. The cured polyethylene tube is then coated with a layer of adhesive means, followed by braiding a first tubular layer on the adhesive means, followed by wrapping a layer of neoprene rubber against the first tubular layer, and followed by braiding a second tubular layer against the neoprene to define an assembly. The assembly is then again wrapped with a similar plastic film as before, covered with a nylon wrapping cloth, and subjected to temperature of 300° F for approximately 2 hours to vulcanize the neoprene and bond the tube and layers together and complete the hose construction whereupon the plastic film and nylon cloth are removed and the hose construction removed from the mandrel.

With the above presently used method it is apparent that it is necessary to add a suitable peroxide to polyethylene in a predetermined ratio, carry out two curing cycles of roughly two hours each, and wrap plastic film and nylon cloth around the assembly in two separate stages and then discard such film and cloth each time; whereby it is apparent that the presently used method requires considerable equipment, is time consuming, requires discarding large quantities of plastic film and nylon cloth and thus increases the cost of the overall hose construction.

SUMMARY

This invention provides an improved method of making a hose construction using an inner polyethylene tube which eliminates the equipment and techniques associated with the use of peroxide to provide crosslinking of molecules in such polyethylene tube, eliminates one curing cycle and the associated time required for curing, and eliminates the need for protective covering materials ordinarily required for one curing cycle and the time to apply same. The method employs an irradiated polyethylene tube which is supported on a mandrel and has a first tubular layer braided therearound followed by a tubular layer of neoprene rubber and followed by a second tubular layer braided against the neoprene whereupon the layers and tube are subjected to a controlled temperature environment to vulcanize the rubber and complete the hose construction.

Other details, uses, and advantages of this invention will be readily apparent from the exemplary embodiments thereof presented in the following specification, claims, and drawing.

BRIEF DESCRIPTION OF THE DRAWING

The accompanying drawing shows a present preferred embodiment of this invention, in which FIG. 1 is a view with parts in cross-section, parts in elevation, and parts broken away illustrating an exemplary hose construction made utilizing the method of this invention:

FIG. 2 is a schematic view with parts in cross-section illustrating an uncured polyethylene tube being irradiated using an electron beam accelerator to cure such tube;

FIG. 3 is a schematic view particularly illustrating the manner in which an irradiated polyethylene tube may be installed and supported on a supporting mandrel;

FIG. 4 is a schematic view illustrating the application of a primer followed by an adhesive on the outside surface of the tube prior to braiding a tubular braid against the adhesive;

FIG. 5 is a schematic view illustrating the step of braiding a first tubular layer against the adhesive layer;

FIG. 6 is a view illustrating the placing of a layer of unvulcanized rubber against the first braided layer;

FIG. 7 is a schematic view illustrating the step of braiding a second tubular layer against the layer of rubber;

FIG. 8 is a view illustrating the wrapping of the assembly of FIG. 7 first with a plastic film and then a nylon cloth to protect same during curing thereof; and FIG. 9 is a schematic view particularly illustrating the construction of FIG. 8 being subjected to a controlled temperature environment.

DETAILED DESCRIPTION

Reference is now made fo FIG. 1 of the drawing which illustrates one exemplary embodiment of a hose construction made utilizing the method of this invention and such hose construction is designated generally by the reference numeral 10. The hose construction 10 comprises an inner tube 11 made of an irradiated polyethylene and such tube has an inside tubular surface 12 and an outside tubular surface 13 and has adhesive means designated generally by the reference numeral 15 shown as a tubular sleeve-like structure. The hose construction 10 also has a first braided tubular layer 16 which engages the adhesive means 15 followed by a layer of rubber 17 which engages the first braided layer 16 and has a second braided tubular layer 20 which engages the rubber layer 17 and in this example defines the outside surface of the hose construction 10. The hose construction 10 with its various component tubular layers is made with optimum economy utilizing the method of this invention; yet, such hose has optimum structural strength and may be used to carry fluids of all types under pressure including fluids or liquids such as corrosive chemicals, inert fluids, flowable food products, and the like.

The method of this invention is particularly adapted to eliminate special equipment, the discarding of comparatively large quantities of processing materials, and the need for tieing up curing equipment for excessive time periods as is required with methods used heretofore which employ polyethylene tubing which is cured using a peroxide, or the like.

With the method of this invention, an uncured polyethylene tube is cured by crosslinking the molecules thereof using radiation techniques. For example, a device in the form of an electron beam accelerator 25, shown schematically in FIG. 2, and of known construction and operation is provided and a length of tubing, which for easy correlation with the completed tube of FIG. 1 is designated generally by the reference numeral 11, is placed within the device 25. The electron beam accelerator or device 25 is used to accelerate beta particles and bombard the tube 11 therewith to obtain a radiation dosage which may vary within a range of 10 through 50 megarads. During this irradiation the molecules of polyethylene are crosslinked or cured to provide an optimum carbon-oxygen-carbon bond and cured polyethylene tube of optimum stability as well as structural integrity. As is well known in the art it will be appreciated that a rad is a unit of absorbed dose of ionizing radiation equal to an energy of 100 ergs per gram of irradiated material, polyethylene in this instance, whereby a megarad equals $1 \times 10^8$ ergs.

The cured or irradiated polyethylene tube 11 is then supported on a suitable mandrel shown as a steel mandrel 26 in FIG. 3 and the supporting is achieved by clamping an end portion 27 of the tube 11 around an inflating apparatus 30 using a clamp 31 and the apparatus 30 is supplied with air under regulated pressure through a conduit 32 from a suitable pressure source 33; and, the apparatus employs a suitable air shutoff valve 34 which may be installed in the conduit 32. The steel mandrel 26 has a bullet-like nose 35 enabling easy insertion thereof within the tube 11 and may employ a pair of mandrel pushing units which may be in the form of belt-like endless pushing devices 37 of known construction and operation. The devices 37 are suitably driven or powered and engage opposed surfaces of the steel mandrel 26 as indicated at 40 and 41 and push such mandrel toward the apparatus and hence within the tube 11 while opening the valve 33 to partially radially expand the cured tube 11 so that the mandrel 26 is within such tube as shown by dotted lines at 38. The mandrel 26 may be provided as a single mandrel, but preferably is a two-piece mandrel the first piece 42 of which is pushed substantially entirely within the tube 11 by a second piece 43 and the first piece 42 has a length substantially equal to the length of the tube 11. After the mandrel piece 42 is installed within the tube 11, such tube is unclamped from the apparatus 30.

After supporting the tube 11 on the steel mandrel suitable adhesive means which is designated by the same reference numeral 15 as in the hose construction 10 is applied, see FIG. 4, on the outside surface 13 of the tube 11 and such adhesive means 15 is made up of two layers in the form of a primer layer 44 applied against the tube 11 followed by an adhesive layer 45. A preferred form of primer layer 44 may be a halogenated elastomeric based metal primer, such as identified by the name "Thixon D-6763", manufactured by Whittaker Corporation. The inventor has found that this primer has a particular affinity for cured polyethylene. A preferred adhesive 45 may be an ethylene propylene copolymer based cement, such as identified by the name "Thixon AP-1559", also manufactured by Whittaker Corporation. This adhesive has been found to cooperate with the primer to enable the braided layer 16 to be firmly bonded to the tube 11 during the curing process. Without this combination of materials, a proper bond will not be achieved between the cured or crosslinked polyethylene tube and the braided layer.

The outer adhesive layer 45 is applied immediately prior to braiding a first tubular reinforcing layer, designated by the reference numeral 16, as in the hose construction 10, directly against the adhesive layer 45 and as illustrated in FIG. 5. The first braided tubular layer is applied using a braiding machine or braider 46 of known construction. The braider 46 employs a plurality of individual filaments 47 of material carried on spools 50 and such filaments are braided directly around the mandrel reinforced tube 11 to define the tubular braided layer 16.

After braiding the layer 16 into position a second tubular reinforcing layer 17 of unvulcanized rubber is placed against the braided layer 16 as shown in FIG. 6. Although any suitable technique and method of placing the layer of rubber may be provided, the step is achieved in this example by wrapping a ribbon-like strip, designated by reference numeral 17, of unvulcanized neoprene rubber in a substantially helical pattern with a slight overlap 51 between adjoining turns. The neoprene rubber is preferably a comparatively thin strip generally of the order of a few, up to 70, mils thick which is undusted and may be wrapped as a single-thickness layer or as a layer having a plurality of thicknesses. However, regardless of the number of thicknesses defining the rubber layer 17, once the rubber is vulcanized it defines a unitary single piece body which also bonds to braided layer 16 and to another braided layer applied thereover and as will now be described.

As illustrated in FIG. 7 a second tubular layer 20 is braided against the layer of neoprene rubber again utilizing the braider 46 with its filaments 47 and spools 50 and in a similar manner as achieved in braiding the braided layer 16.

After braiding the layer 20 in position and as illustrated in FIG. 8 a plastic film 53 is wrapped in strip form around the outer braided tubular layer 20 followed by an outer covering of nylon wrapping cloth 54 to define an assembly which is designated generally by the reference numeral 55 which is ready for curing.

The curing is achieved in a controlled temperature environment shown as an oven 56 in FIG. 9 which has suitable temperature controls (not shown) which operate in accordance with techniques which are well known in the art and the oven is preferably controlled at a temperature generally of the order 300° F for a predetermined time of roughly several hours and preferably a time ranging between 1½ and 2 hours whereupon the layer of rubber 17 is vulcanized and simultaneously the tube 11 and layers 15, 16, 17, and 20 are bonded together as a unitary construction to define the unique hose construction 10 of this invention.

After curing, the assembly is removed from the oven and suitably cooled in accordance with techniques which are well known in the art whereupon the nylon wrapping cloth 54 and plastic film 53 are removed therefrom and discarded. In addition, the mandrel is removed from within the tube 11 and this removal is achieved by grasping the outside surface of the hose construction 10 using apparatus in common use in the art for this purpose and pushing the mandrel from within the tube 11.

The completed hose construction 10 may then have suitable end fittings provided thereon; and, if desired, the hose construction 10 may have an outer protective cover provided thereon with such cover being in the form of a sleeve-like cover made of a tubular elastomeric material or in the form of a braided cover.

During the installation of the portion or section 42 of the two-piece mandrel 26 within the tube 11, it is only necessary that the apparatus 30 provide partial radial expansion or inflation of the tube 11 a small increment generally of the order of a few thousandths of an inch inasmuch as the portions 42 and 43 of the mandrel are sized so that each is approximately equal to the normal inside diameter of the tube 11. In addition, this close sizing allows easy removal of the mandrel portion 42 from within the tube 11 once the method steps of this invention have been completed.

As previously indicated two tubular layers of braided material or braid comprise the exemplary hose construction 10 and the braider 46 is employed to braid each layer in position; however, it is to be understood that more than two braided layers may be provided with a rubber layer between each immediately adjacent pair of layers of braid.

The braider 46 employs individual continuous filaments 47 of material carried on spools 50, as described previously, and the filaments are braided directly around the mandrel-reinforced tube. Any suitable filamentary material may be used to define the braided layers 17 and 20, such as, filaments made of plastic fibers, natural fibers, metal, glass fibers, and the like. Further, it will be appreciated that a particular material may be used to make both layers 16 and 20. Similarly the layer 16 may be of one material and the layer 20 of another material or each of the layers 16 and 20 may be made of various materials in any desired combination.

While present exemplary embodiments of this invention, and methods of practicing the same, have been illustrated and described, it will be recognized that this invention may be otherwise variously embodied and practiced within the scope of the following claims:

What is claimed is:

1. A hose construction comprising, an inner tube of irradiated-cured polyethylene, a layer of primer adjoining said tube with said primer layer having an affinity for cured polyethylene, a layer of adhesive on said layer of primer, at least one layer of tubular reinforcing material disposed against said layer of adhesive, said layers of primer and adhesive assuring a proper bond between said cured polyethylene tube and said braided layer, and a layer of vulcanized rubber adjoining said layer of tubular reinforcing material, said tube and said layers bonded together into a unitary structure.

2. The hose construction of claim 1 in which said primer is a halogenated elastomeric based material and said adhesive is an ethylene propylene copolymer based material.

3. The hose construction of claim 1 and further comprising a second layer of tubular reinforcing material disposed around and against said layer of rubber.

4. The hose construction of claim 3 in which said tubular reinforcing material is formed of braided filaments.

5. The hose construction of claim 4 in which said filaments are formed of metal.

6. The hose construction of claim 4 in which the filaments of said first layer are formed of a material which is dissimilar to the material of the filaments of said second layer.

* * * * *